Sept. 25, 1951          G. HEPP          2,569,309
WAVE LENGTH MODULATION
Filed July 12, 1946
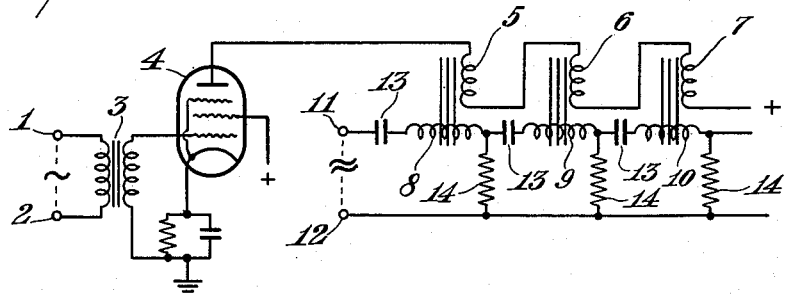
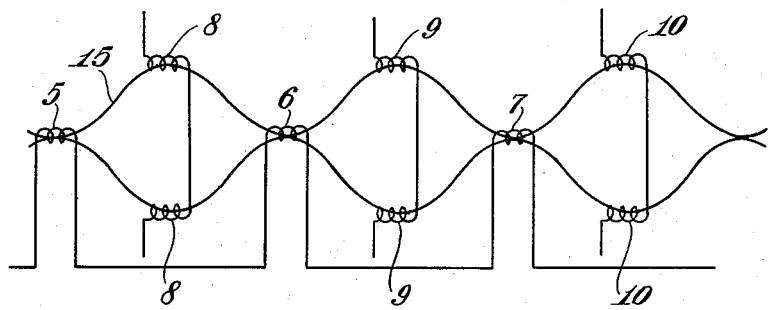
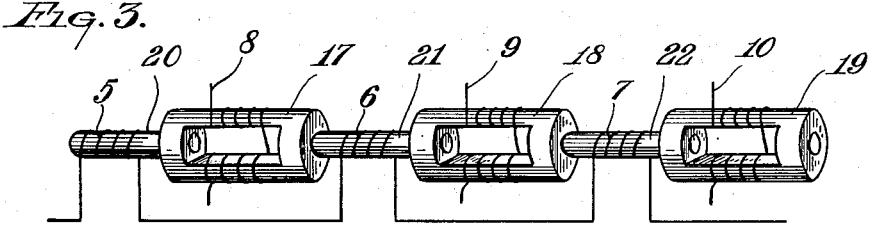
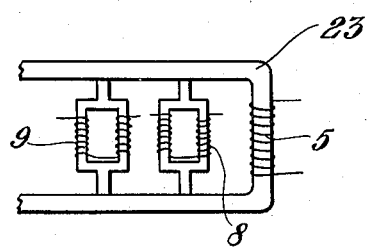
GERARD HEPP
    INVENTOR.
BY
ATTORNEY.

Patented Sept. 25, 1951

2,569,309

UNITED STATES PATENT OFFICE 2,569,309

WAVE LENGTH MODULATION

Gerard Hepp, Eindhoven, Netherlands, assignor to Hartford National Bank and Trust Company, Hartford, Conn., as trustee Application July 12, 1946, Serial No. 683,060
In the Netherlands June 21, 1943

5 Claims. (Cl. 332—22)

This invention relates to a circuit arrangement for phase modulation of electric oscillations, the phase modulation being effected by supplying these oscillations to a network constituted by a certain number of cells each of which comprises at least one inductance coil with ferro-magnetic core, the inductance of which is influenced as a function of the modulating oscillation by that the magnetisation of the said cores is determined by a modulating control current traversing at least one magnetizing winding.

In a circuit arrangement of this kind the inductance of a certain number, as a rule large number of inductance coils must be influenced. Hitherto this was effected by providing each of the coils with a ferro-magnetic core on which a magnetising winding was arranged and whose magnetisation was determined by a modulating control current traversing the said winding. This form of construction leads, however, to a highly complicated circuit since each core must be constructed and adjusted individually; besides, it is thus difficult to construct a network whose cells are completely identical or substantially identical to one another, which is highly desirable for a satisfactory phase modulation.

Now, the present invention provides a method whereby the above-mentioned drawbacks are avoided without any troublesome coupling between the inductance coils being involved.

The circuit arrangement according to the invention exhibits the characteristic that the inductance coil of each cell is constituted by two portions wound in opposite senses on two magnetic cores connected in parallel and combined into a primary circuit, that the primary circuits belonging to the different inductance coils are included in parallel and/or in series in a magnetic main circuit on which the magnetising winding is arranged, and that the junctions between each primary circuit and the main circuit are between the two portions of the inductance coil of the primary circuit in question.

Besides, in the circuit according to the invention no coupling or substantially no coupling occurs between the said network and the circuit traversed by the modulating control current.

The various circuits may be constituted, for example, by two sets of strips of ferro-magnetic material, for example Pupin sheet metal, which strips alternately engage each other through a distance and are bent away from each other through a distance, the magnetising windings being arranged at those points where the strips engage each other and the inductance coils being arranged at those points where the strips are bent away from each other.

The primary magnetic circuits may alternatively be constituted by hollow cylindrical bodies of ferro-magnetic material, in which at points opposite each other portions are removed out of the cylindrical wall and the remaining portions serve as cores for the inductance coils, the primary circuits being relatively connected by means of ferro-magnetic cores having the magnetising windings arranged on them.

In order that the invention may be clearly understood and readily carried into effect, it will be described more fully with reference to the accompanying drawing forming a part of the specification and in which:

Fig. 1 is a schematic diagram of a circuit arrangement for phase modulating electric oscillations by means of a network according to the invention.

Fig. 2 is a schematic representation of a construction of a circuit component of the network shown in Fig. 1, Fig. 3 illustrates an alternate construction of said circuit component, and Fig. 4 illustrates still another construction of said component.

Figure 1 shows a circuit arrangement for the phase modulation of electric oscillations with the aid of a network constituted by a certain number of cells each of which includes an inductance coil with ferro-magnetic core, the inductance of which is influenced by the modulating oscillation.

The modulating oscillation is supplied to the terminals indicated by 1, 2 to which the primary winding of a transformer 3 is connected. The voltage produced in the secondary winding is led to the control grid of a pentode 4. The anode current of the latter successively traverses the turns of several series-connected magnetising windings 5, 6 and 7, which act upon the magnetisation of the cores and, hence, upon the inductance of three inductance coils 8, 9 and 10.

The oscillation to be modulated is supplied to the input terminals 11, 12 of a network, with the aid of which the phase modulation is effected. The network is constituted by three cells; the first cell includes, connected in series, a condenser 13, the inductance coil 8 and a resistance 14. The second cell is connected to the resistance of the first cell and includes a similar series connection in which, however, the inductance coil 9 takes the place of the coil 8. The third cell is constituted and connected similarly to the second cell, but now the inductance coil 10 takes the place of coil 9. The oscillation modulated in phase is taken from the output terminals of the resistance of this cell.

The series-connections constituted by one of the condensers 13 and one of the coils 8, 9 and 10 respectively are each tuned to the frequency of the oscillation to be modulated.

The phase modulation is effected by that the magnetisation of the core of the coils 8, 9 and 10 and, hence, the inductance of these coils is varied in the rhythm of the modulating oscillation due to the current (control current) flowing through the magnetising windings 5, 6 and 7.

Now Figures 2 and 3 illustrate two manners in which the coils 8, 9 and 10 and the magnetising windings 5, 6 and 7 according to the invention may be realised efficiently.

Figure 2 shows two sets of strips 15, 16 bent in the shape of waves, which are of ferro-magnetic material, such as Pupin sheet metal. These strips approximately have the form of two sinusoids engaging each other and being relatively displaced in phase by 180°, the magnetising windings 5, 6 and 7 being arranged at those points where the strips engage each other and the inductance coils 8, 9 and 10 respectively, consisting of two portions, being arranged at those points where the strips are remote from one another. In this case one half of each coil is arranged on one strip and the other half on the other strip.

In Figure 3 the primary magnetic circuits are constituted by hollow cylindrical bodies 17, 18 and 19 respectively of finely-divided ferro-magnetic material of which portions are removed out of the cylindrical wall at points opposite each other whilst the remaining portions serve as cores for the inductance coils 8, 9 and 10 respectively. As before, each of the coils is constituted by two portions of which the one portion is wound on the one core and the other portion is wound on the other core of one and the same hollow cylindrical body. The cylindrical bodies are relatively connected in series by means of ferro-magnetic cores 20, 21 and 22 respectively, on which the magnetising windings 5, 6 and 7 respectively are arranged.

The two halves of each coil are wound in such manner that the magnetic fluxes originating from each of these halves amplify each other within the primary magnetic circuit in question. The two halves of each coil jointly do not embrace or substantially do not embrace the magnetic flux originating from the magnetising windings. Consequently, no high-frequency coupling or substantially no high-frequency coupling occurs between the control circuit and the network; besides, in the circuit arrangement according to the invention it is ensured that there occurs no coupling or substantially no coupling between the coils 8, 9 and 10.

Figure 4 shows a form of construction in which the various primary magnetic circuits (of which two only are shown, viz. 8 and 9) are included connected in parallel, in a magnetic main circuit 23. In this case the magnetisation of the cores of the primary magnetic circuits is influenced by one magnetising winding, indicated by 5.

What I claim is:

1. A circuit arrangement for phase modulating an electric wave, comprising a core assembly having a plurality of branches each comprising first and second core members spaced apart at the central portion thereof and connected together at the end portions thereof and a third core member interconnecting an end portion of one of said branches and the adjacent end portion of an adjacent other of said branches, high frequency induction coils arranged on said first and second core members and connected together in aiding relationship, a magnetizing winding arranged on said interconnecting third core member, means to apply said electric wave to said induction coils, and means to apply modulating currents to said magnetizing winding to vary the permeability of said first and second core members and produce changes in the magnetic fluxes therein thereby to phase modulate said electric wave.

2. A circuit arrangement for phase modulating an electric wave, comprising a core assembly having a plurality of branches each comprising first and second core members spaced apart at the central portion thereof and connected together at the end portions thereof and a third core member interconnecting an end portion of one of said branches and the adjacent end portion of an adjacent other of said branches, high frequency induction coils arranged on said first and second core members and connected together in series aiding relationship, a magnetizing winding arranged on said interconnecting third core member, means to apply said electric wave to said induction coils, and means to apply modulating currents to said magnetizing winding to vary the permeability of said first and second core members and produce changes in the magnetic fluxes therein thereby to phase modulate said electric wave.

3. A circuit arrangement for phase modulating an electric wave, comprising a core assembly having three branches spaced apart and each comprising first and second core members spaced apart at the central portion thereof and connected together at the end portions thereof and third core members interconnecting an end portion of the first of said branches and the adjacent end portion of the second of said branches and the other end portion of the second of said branches and the adjacent end portion of the third of said branches, high frequency induction coils arranged on said first and second core members and connected together in series aiding relationship, a magnetizing winding arranged on each of said interconnecting third core members, means to apply said electric wave to said induction coils, and means to apply modulating currents to said magnetizing winding to vary the permeability of said first and second core members and produce changes in the magnetic fluxes therein thereby to phase modulate said electric wave.

4. A circuit arrangement for phase modulating an electric wave, comprising a core assembly having a plurality of branches spaced apart and each comprising a hollow cylindrical body having a substantially rectangular longitudinal cross section with opposing side portions spaced apart and a core member interconnecting said branches, high frequency induction coils arranged on said spaced portions and connected together in series aiding relationship, a magnetizing winding arranged on each of said interconnecting core members, means to apply said electric wave to said induction coils, and means to apply modulating currents to said magnetizing winding to vary the permeability of said core member and produce changes in the magnetic fluxes therein thereby to phase modulate said electric wave.

5. A circuit arrangement for phase modulating an electric wave, comprising a core assembly having a plurality of branches each branch comprising core members spaced apart and having a substantially rectangular longitudinal cross section with opposing side portions spaced apart and a core member interconnecting said branches in shunting relationship, high frequency induction coils arranged on said spaced side portions and connected together in series aiding relationship, a magnetizing winding arranged on said interconnecting core member, means to apply said electric wave to said induction coils, and means to apply modulating currents to said magnetizing winding to vary the permeability of said core member and produce changes in the magnetic fluxes therein thereby to phase modulate said electric wave.

GERARD HEPP.

REFERENCES CITED

The following references are of record in the file of this patent:

UNITED STATES PATENTS

| Number | Name | Date |
| --- | --- | --- |
| 1,357,264 | Van Dyke | Nov. 2, 1920 |
| 2,278,658 | Kroger | Apr. 7, 1942 |